July 5, 1932.  G. W. WRIGHT  1,865,994
UNITARY ROTARY VALVE
Filed Feb. 10, 1931
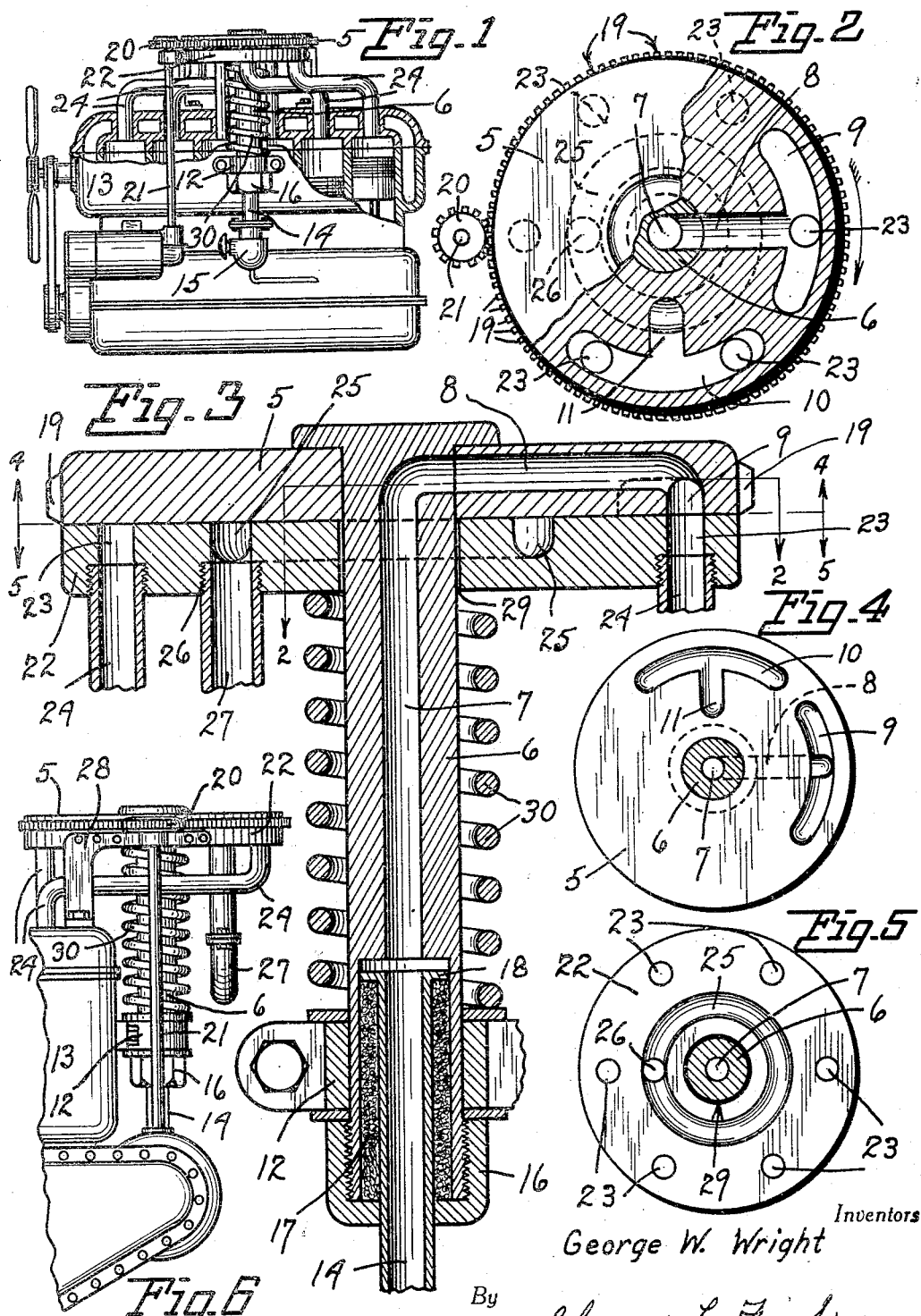
Inventors
George W. Wright
By Glenn L. Fish
Attorney Patented July 5, 1932

1,865,994

UNITED STATES PATENT OFFICE

GEORGE W. WRIGHT, OF LEWISTON, IDAHO

UNITARY ROTARY VALVE

Application filed February 10, 1931. Serial No. 514,888.

My invention relates to unitary rotary valves and more particularly to a rotary disc valve adapted for use in replacing the multiple valve system in present day use on internal combustion and other engines. Certain objects of the invention are to provide a rotary valve comprising a stationary and a rotary disc member that are cooperatively arranged to perform the intake and exhaust functions of all the cylinders of a multi-cylinder engine. Further objects are to provide a unitary valve that is smooth and noiseless in its action, that will not become worn unevenly and will therefore eliminate knocking, and whereby the necessity for re-grinding and the consequent expense is obviated. Other objects are to provide a valve that is simple and durable in construction, reliable and efficient in operation, and which may be manufactured at comparatively small cost.

With the above and other objects in view which will appear as the description proceeds, the invention consists of the novel construction, adaptation, combination and arrangement of parts hereinafter described and claimed. These objects are accomplished by devices illustrated in the accompanying drawing; wherein:—

Figure 1 is a view in side elevation showing my device installed on an internal combustion engine;

Fig. 2 is a top plan view of the upper or rotary disc member and its actuating pinion with parts shown in horizontal section along a broken line 2, 2 of Fig. 3;

Fig. 3 is a view in central vertical section of the device;

Fig. 4 is a view in horizontal section taken on a broken line 4, 4 of Fig. 3 and showing the rotary disc member in bottom plan;

Fig. 5 is a view in horizontal section taken on a broken line 5, 5 of Fig. 3 and showing the stationary disc member in top plan; and Fig. 6 is an enlarged view in end elevation showing the device mounted on fragmentary portions of an internal combustion engine.

Referring to the drawing throughout which like reference numerals indicate like parts, the numeral 5 designates the rotary disc member of the device that is horizontally disposed and provided with a relatively long depending stem 6 that is shrunk, brazed or otherwise fixedly connected to the center of said disc. Said stem is hollowed by a conduit 7 extending upwardly therethrough and horizontally through one side portion of the disc as at 8. The outer end of said conduit is centrally connected with a groove 9 on the underside of said disc near its outer edge and concentrically extending nearly one-quarter of its circumference. One quarter around said circumference from said groove another corresponding groove 10 is provided on the underside of said disc which groove is centrally provided with an offset or tail portion 11 extending concentrically about one-half the distance to the center of said disc member.

The lower end of the hollow stem 6 is supported by a bearing 12 fixed to an engine casing 13 and a pipe 14 connects said end with the carburetor 15 of the engine. Said pipe extends into the lower end of said stem and a cup nut 16 on the bottom of the stem serves as retaining means for a packing gland 17 that is interposed between the connecting portions of said stem and pipe. Said pipe has a bearing flange 18 on its upper end and it will be obvious that the stem may rotate freely thereon and the fuel may therefore pass from said carburetor through said pipe and through the conduits 7 and 8 into the groove 9. The disc member 5 is provided with gear teeth 19 around its periphery and a pinion 20 in mesh therewith is fixed to the upper end of a vertical shaft 21 whose lower end may be connected by a chain of timing gears with the main or crank shaft of the engine in the regular manner and in such ratio that the disc member will make one revolution for each two revolutions of the crank shaft for a four cycle engine as will be understood.

The under face of the rotary disc member 5 is dressed smoothly and a stationary disc member 22, correspondingly dressed on its upper surface and of a corresponding diameter, fits flush against the underside of said upper or rotary disc. Said stationary disc is provided with a plurality of ports 23 extending therethrough in equal spaced relation around its outer edge portion and disposed directly in the path of the two grooves 9 and 10 of the rotary disc. There are one each of such ports for each cylinder of the engine to which the device is attached and a pipe 24 leads from each of said ports to said cylinders as shown in the drawing thus completing the intake means. The upper face of said stationary disc is provided with a concentric ring groove 25 that is disposed continuously in the path of the offset or tail portion 11 of the groove 10 in the rotary disc and a port 26 extending from said ring groove through the stationary disc has an exhaust pipe 27 connected thereto thus completing the exhaust line of the device.

The pipes 24 serve as a partial support for the stationary disc member 22 and brackets 28 connected thereto and to the engine casing 13 complete its supporting means. Said stationary disc serves as a support for the rotary disc member 5 whose stem 6 is journaled through a port 29 in the center of the stationary disc and a coiled spring 30 disposed around said stem and interposed between the stationary disc and the lower portion of the stem may be provided for the purpose of resiliently holding said two discs together to form a lock tight connection.

Referring particularly to Fig. 2 of the drawing and assuming that the rotary disc member 5 is rotating in a clockwise direction as indicated by the direction arrow and also bearing in mind that the engine under discussion is a four cycle engine making two revolutions to complete its intake, compression, power and exhaust strokes for each cylinder and for each revolution of the rotary disc member, said rotary disc will come back to its starting point at the exact time the cylinders complete their cycles. The cylinder whose port 23 and pipe 24 is in registry with the groove 9 as shown in Fig. 2 is engaged on its intake stroke and is taking fuel from the carburetor 15 through the pipe 14 and conduits 7 and 8. The compression and power strokes of this particular cylinder will take place during the passage of the comparatively wide blank space between said intake groove 9 and the exhaust groove 10 of the rotary disc which space extends substantially half the diameter of said disc.

The exhaust groove 10 which is positioned three-quarters around to the left or in a counter-clockwise direction from the intake groove 9 will therefore register with the pipe 24 from the particular cylinder under present consideration at the time its exhaust stroke is taking place and will come back to its initial point when the intake stroke again takes place thus completing its cycle. The foregoing described action is true of all the other cylinders whose intake pipes 24 are connected at equal intervals around the stationary disc and whose connecting rods are likewise connected to the engine crank shaft at correspondingly regular distances.

It will now be apparent that I have provided a rotary valve of simple and durable construction, that is direct acting and efficient in operation, which will run smoothly with little wear and expense of upkeep, and which may be manufactured at a comparatively small cost. Having thus described my invention, it being understood that minor changes may be resorted to in its construction and arrangement without departing from the scope and spirit of the invention, what I claim and desire to secure by Letters Patent of the United States is:

The combination with a multi-cylinder internal combustion engine, of a unitary rotary valve comprising a rotary disc member, a depending stem for said disc having a conduit therethrough, said conduit extending laterally through a portion of the rotary disc and terminating in a concentric groove on its underside, said stationary disc having another corresponding groove on its underside disposed at one-quarter circumference from the first-named groove, said stem revolubly connected with the carburetor pipe of the engine, a stationary disc member supported by the engine and supporting the rotary disc, means for causing one revolution of the rotary disc for each two revolutions of the engine crank shaft, said stem extending through a center hole of the stationary disc, spring means for retaining the two discs in revoluble engagement, said stationary disc having a plurality of spaced holes therethrough disposed in the path of the two aforesaid grooves on the underside of the rotary disc, a pipe connecting each of said holes with a cylinder of the engine, and said stationary disc having a concentric ring groove on its upper face with a hole extending through whereby an exhaust passage is established for the intake conduit at each revolution of the rotary disc.

In testimony whereof I affix my signature.

GEORGE W. WRIGHT.